United States Patent [19]

Stern

[11] 4,005,167
[45] Jan. 25, 1977

[54] PLASTICIZING APPARATUS

[75] Inventor: David Stern, Windsor, England

[73] Assignee: Imperial Chemical Industries Limited, London, England

[22] Filed: Jan. 2, 1973

[21] Appl. No.: 320,286

Related U.S. Application Data

[62] Division of Ser. No. 98,457, Dec. 15, 1970, abandoned, which is a division of Ser. No. 747,297, July 24, 1968, abandoned.

[30] Foreign Application Priority Data

July 28, 1967 United Kingdom ............ 34896/67

[52] U.S. Cl. .............................. 264/329; 264/245; 264/328; 425/245 R
[51] Int. Cl.² ......................................... B29F 1/12
[58] Field of Search ................... 264/328, 329, 245

[56] References Cited

UNITED STATES PATENTS

| 693,315 | 2/1902 | Soderlund | 222/145 X |
|---|---|---|---|
| 3,049,397 | 8/1962 | O'Shaughnessy | 264/245 X |
| 3,599,290 | 8/1971 | Garner | 425/129 X |

FOREIGN PATENTS OR APPLICATIONS 1,007,053  1957  Germany ........................ 264/328

Primary Examiner—Richard R. Kucia
Attorney, Agent, or Firm—Cushman, Darby & Cushman

[57] ABSTRACT

A plasticizing apparatus having a plurality of plasticizing chambers arranged to feed a common outlet consecutively, or concurrently, or serially, the arrangement being such that while one of the chambers is being used to feed the outlet, the other or another chamber can be refilled with material to be plasticized, and can be used to plasticize that material.

3 Claims, 9 Drawing Figures

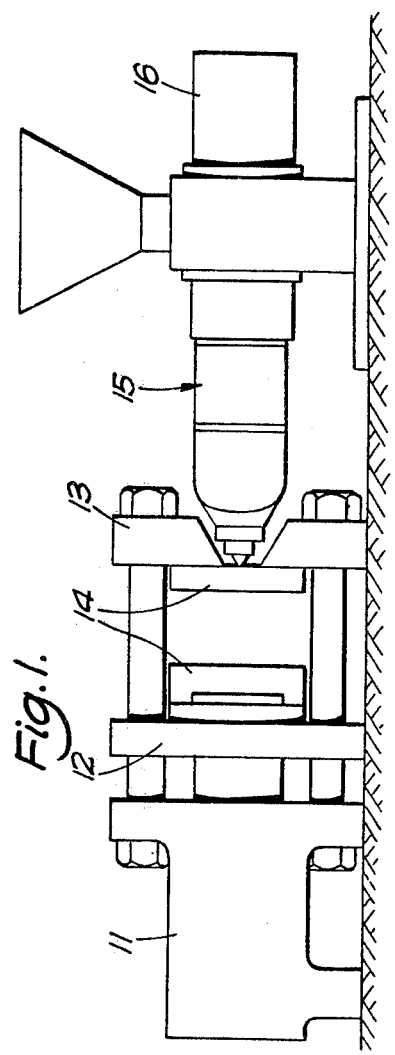
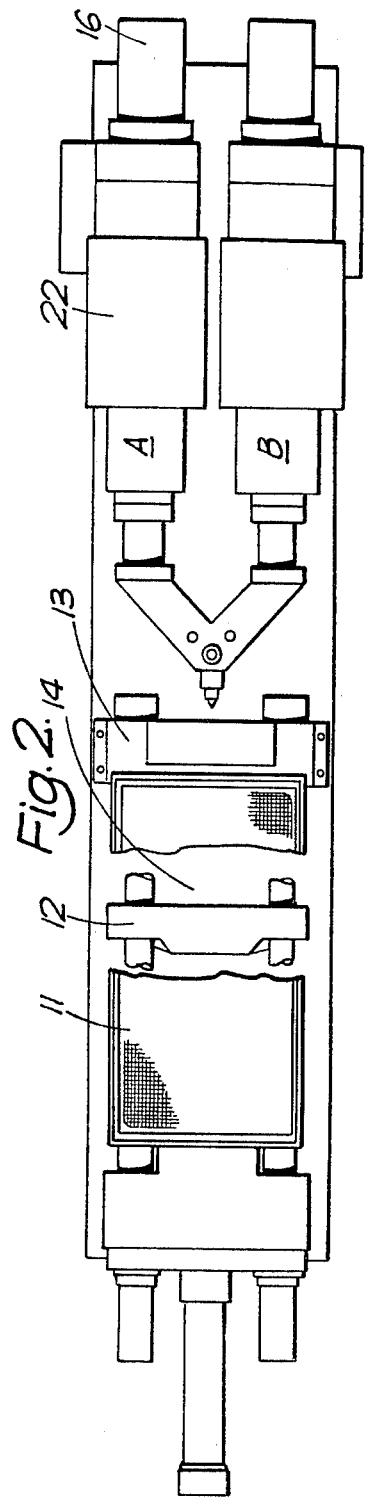

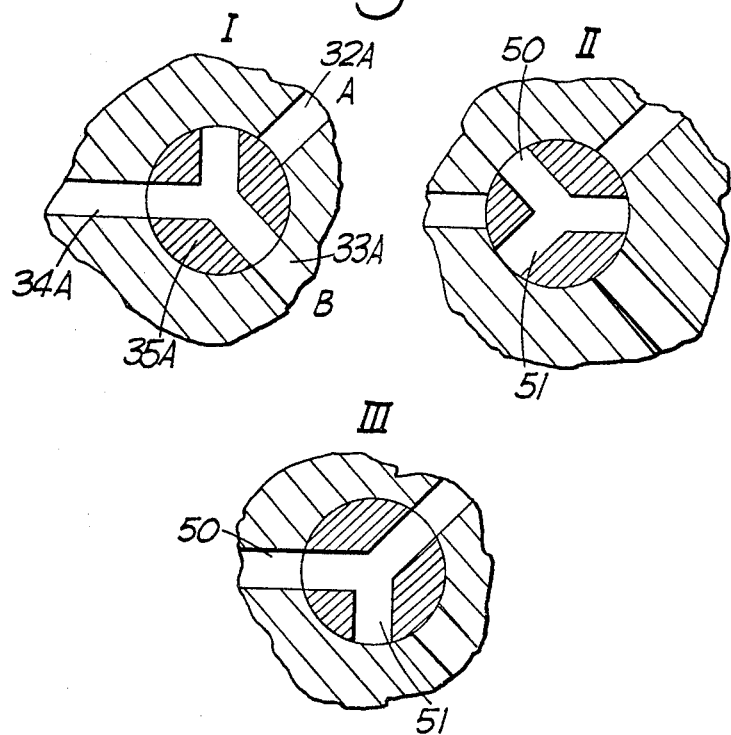
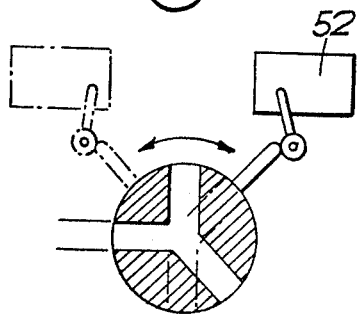

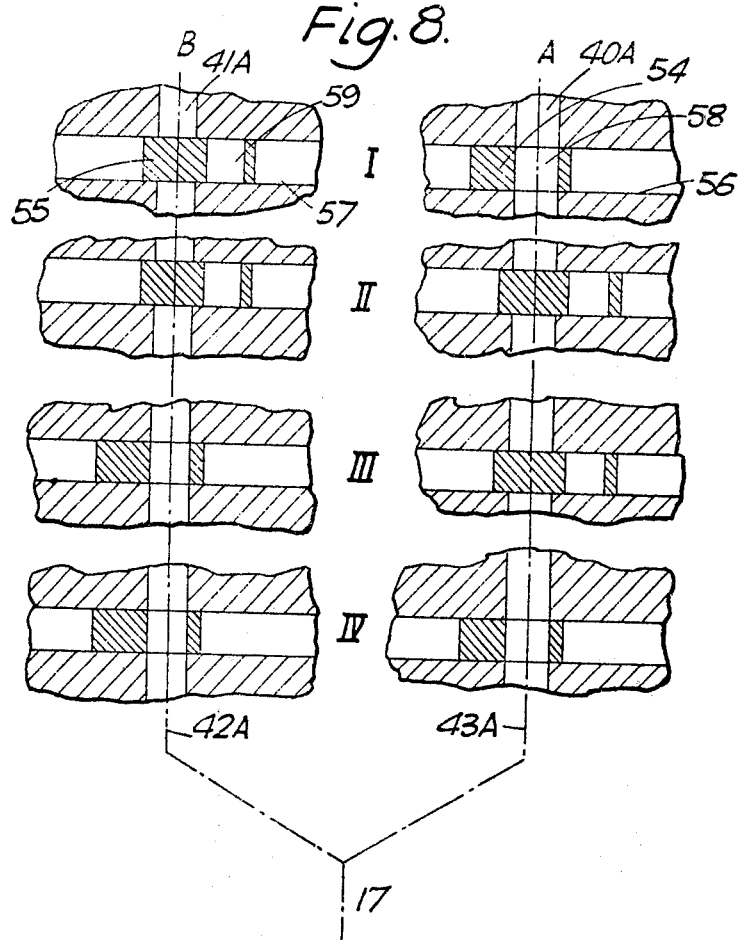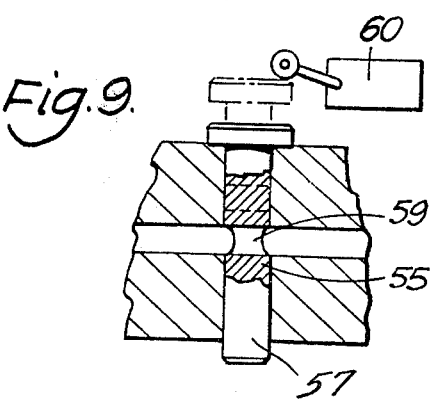

PLASTICIZING APPARATUS

This application is a division of application Ser. No. 98457 (now abandoned) filed Dec. 15, 1970 as a division of application Ser. No. 747297 (now abandoned) filed July 24, 1968.

BACKGROUND OF THE INVENTION

In existing plasticising machines a single plasticising chamber containing a screw piston is used to feed an outlet to a moulding machine. The rate at which mouldings can be produced is determined by the rate at which the plasticising chamber can process material during the time when the moulding function of the machine is not operative. To overcome the delay in the production of mouldings it is desirable that the plasticising function can proceed at the same time as the moulding function. The plasticising machine may be arranged to perform an extrusion function in which case it is desirable to be able to carry out continuous extrusions without waiting for a plasticising function to take place between successive strokes of the piston.

The invention relates to plasticising apparatus and to a method of plasticising plastics material.

The invention provides apparatus for producing a flow of plasticised plastics material comprising at least two chambers connected in parallel to a common outlet, means associated with each chamber to plasticise material in that chamber, means to force plasticised material from each of the chambers to the outlet, means being provided to isolate each of the respective chambers from the outlet.

In one form of the invention the isolation means is such that only one chamber may be in communication with the outlet at one time.

In an alternate form of the invention the isolation means is such that both of the chambers may be in communication with the outlet at the same time.

The invention includes apparatus as described above in combination with an injection moulding machine in which the outlet of the apparatus is arranged to feed a mould or moulds in the injection moulding machine.

The invention also includes apparatus as described above in combination with a blow moulding machine, in which the outlet of the apparatus is arranged to feed a mould or moulds in the blow moulding machine.

The invention also includes apparatus as described above in combination with an extrusion die, and arranged to operate as an extrusion machine.

The invention also provides a method of providing a flow of plasticised plastics material which comprises the steps of plasticising material in at least two separate chambers, connecting the chambers to a common outlet and forcing the plasticised material to the outlet from one of the chambers while refilling another or the other chamber with material and plasticising the material in the chamber.

Preferably the plastics material is forced into a mould after leaving the outlet, and the mould is filled completely by material from only one chamber.

In this form a second mould may be completely filled by material from a second chamber while said one chamber is being refilled with, and is plasticising, further material.

In an alternative form of the invention the plastics material is forced into a mould after leaving the outlet, and the contents (or part of the contents) of more than one chamber are used to fill the mould.

In this last mentioned form it is preferred that a first chamber is connected to fill part of the mould, and is then disconnected from the mould, and then a second chamber is connected to fill another part of the mould.

Alternatively a first chamber is connected to fill a part of the mould, and a second chamber is connected to the mould to fill another part of the mould before the first chamber is disconnected from the mould.

The first chamber may be used more than once to fill the mould.

In another embodiment the chambers may be connected to the outlet serially, i.e. without interruption of the flow.

Several specific embodiments of the invention will now be described by way of example with reference to the accompanying drawings of which:

FIG. 1 is a diagrammatic view in side elevation of a typical injection moulding machine;

FIG. 2 is a plan of an injection moulding machine similar to that shown in FIG. 1;

FIG. 6 is a diagrammatic view of a rotary valve for intermittent or continuous use;

FIG. 7 is a representation of the valve of FIG. 6 arranged to operate a microswitch;

FIG. 8 is a diagrammatic view of a set of linear valves for intermittent or continuous use; and FIG. 9 is a representation of a valve in FIG. 8 as arranged to operate a microswitch.

FIGS. 1, 2, 3 and 4 illustrate a first embodiment of the invention as applied to an injection moulding machine.

Figure 3:
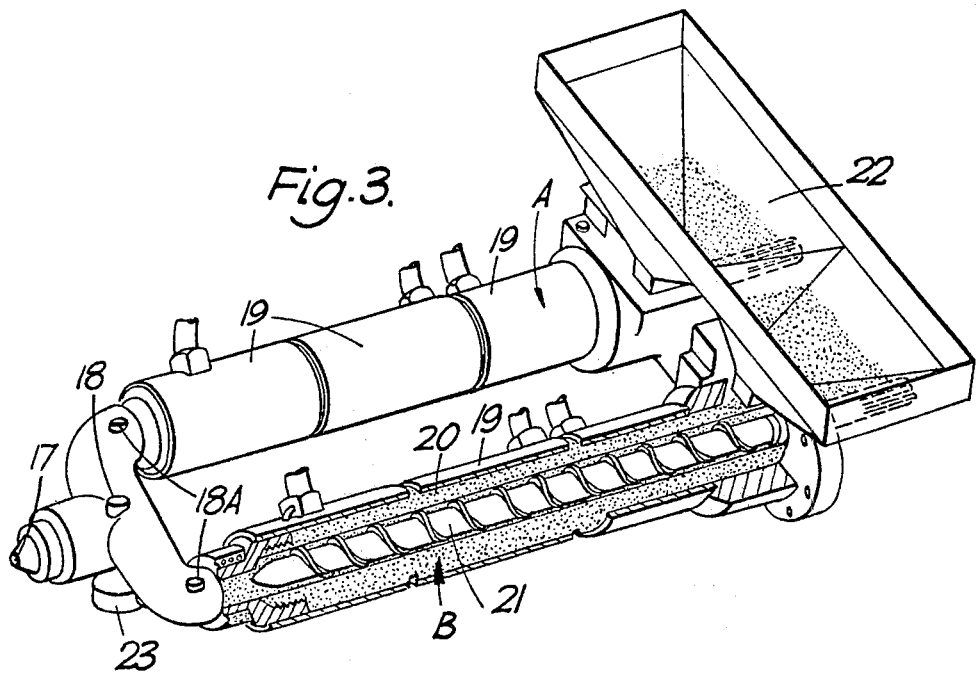
FIG. 3 is a partly cut away perspective view illustrating a feature of the invention.

As shown in FIG. 1 a typical injection moulding machine has a locking head 11, a moving platen 12, a fixed platen 13, and a mould 14 formed of two parts, one being mounted on each of the two platens for engagement when the platen 12 is moved adjacent the platen 13. The machine has an injection unit 15, and rotary and linear motors, generally indicated as 16, arranged to operate the injection unit 15.

Following the invention an injection unit as illustrated in FIG. 3 has an outlet or nozzle 17 which is fed from two plasticisers, indicated as A and B, which plasticisers are arranged in parallel. The plasticisers have heater bands 19 which surround stationary casings 20 and within each of the casings 20 there is a screw plunger element 21 arranged to rotate within the casing, and also to move axially with respect to the casing when operated by the motors 16.

Both plasticisers are fed from a hopper 22 which is disposed above the plasticisers at their end away from the nozzle. Each plasticiser is arranged to feed the nozzle through a rotary valve 18, which is operated by a rotary actuator 23. The rotary valve is shown in diagrammatic form in FIG. 4. The valve has a cylindrical housing 31 which has three passageways disposed in a plane perpendicular to the axis of the housing, two passageways 32 and 33 being spaced apart by 90° from the third passageway 34. The passageways 32 and 33 lead to chambers at the ends of the plasticisers A and B nearer to the nozzle, and the third passageway 34 leads directly to the nozzle. Within the housing there is a rotatable feed element 35 which has an elbow conduit 36 extending between two points on its surface spaced apart by 90° in a plane perpendicular to the housing axis. The conduit 36 may be arranged to connect the passageway 34 with either of the passageways 32 and 33, or may be disposed in an intermediate position in which neither of the passageways 32 and 33 are connected to the conduit 36. The three positions of the feed element are illustrated in the variants I, II and III of FIG. 4.

In use the screw plunger element 21 in the plasticiser B is initially in a "forward" position and is made to revolve. Material in the hopper 22 discharges on to the rear portion of the screw. The screw and cylinder walls are so proportioned as to transfer the material from the rear along the screw and into the chamber immediately in front of the screw. The screw is arranged to be pushed back by the increasing amount of material being delivered to the chamber in front of the screw. The rate at which this transfer from back to front takes place is determined by the efficiency and length of the heaters, the screw configuration, the power and speed available to revolve the screw and nature of the raw material, which, during its transfer from the back to the front of the screw, is converted from a form convenient as a raw material to the condition suitable for injection moulding.

When the screw has reached a backward position it is then driven forward, forcing the material through the passageway 33, the elbow conduit 36 and the nozzle 17 into the closed mould parts 14 filling all the available space in the mould with the plasticised material.

The screw continues to press forward upon the material until the part being moulded has become rigid at a gate portion of the mould. The rotary valve 18 is switched to the position II so isolating the mould for the withdrawl of the moulded article.

The screw plunger element 21 now re-commences as above.

While the plasticiser B is being fed from the hopper, the plasticiser A is connected to the nozzle 17 through the rotary valve 18 via passageway 32 and the elbow conduit 36. Thus the two plasticisers alternatively rotate and move away from the nozzle to plasticise the material from the hopper; and move forward to force material into the mould. While plastics material from one plasticiser is injected into the mould, is allowed to harden, and is discharged from the mould, the other plasticiser is operating to convert raw material from the hopper into a form suitable for injection.

Depending upon choice of moulding material, moulding thickness, mould design and moulding weight in relation to capacity of the machine, the moulded part may be discharged from the mould before the screw has placticised and transferred sufficient material from the hopper to the front compartment to allow another moulding to be produced. Under these circumstances the moulding of a further part must be delayed until sufficient amount of raw material has been processed by another screw 21.

The production rate of the machine is then determined by the rate a given plasticising unit can process material during the time the screw is not occupied in its other function.

A typical sequence of two consecutive cycles using the device is now described by way of example:

A 7 oz. moulding made of polypropylene is produced on units having a plasticising rate in this material of one-half oz. per second, and requiring 3 seconds for the injection phase, and the sequence discharging the moulding from the machine taking place as indicated hereunder:

| Inject (A) | 3 secs. | Plasticise 14 secs. |
|---|---|---|
| Hold | 10 secs. | Unit B |
| Discharge | 3 secs. | |
| Inject (B) | 3 secs. | Plasticise 14 secs. |
| Hold | 10 secs. | Unit A |
| Discharge | 3 secs. | |
| | 32 secs. | For 2 parts. |

It will be appreciated that the embodiment described above may be applied to a blow moulding machine as well as an injection moulding machine.

Figure 5:
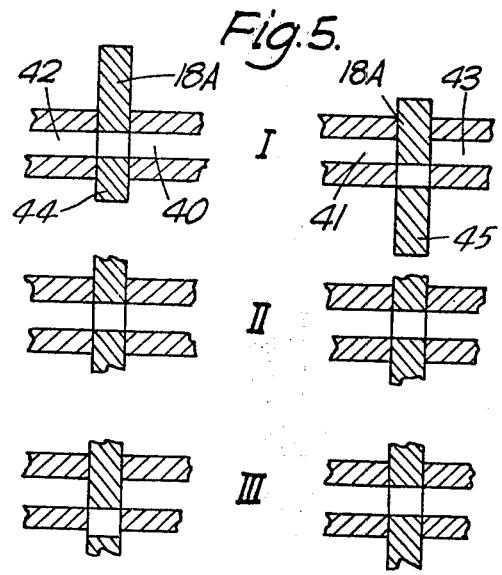
FIG. 5 is a diagrammatic view of a valve used in a second embodiment of the invention and also showing three operating positions.

In a second embodiment of the invention, as illustrated in FIGS. 3 and 5, the plasticisers are connected to an outlet or orifice formed as an extrusion head. In this embodiment linear valves 18A are used. As shown diagrammatically in FIG. 5 channels 40 and 41 lead from the plasticisers A and B respectively, and channels 42 and 43 lead to the extrusion head. The valves have slidable portions 44 and 45 which may be arranged either to connect or isolate the channels 40 and 42, and 41 and 43 respectively.

In this embodiment the screws 21 alternately force plasticised material through the outlet or extrusion orifice to produce a continuous extrusion.

Continuous delivery through the nozzle or orifice is achieved by the use of linear valves 18A in conjunction with the screws 21 functioning as hereunder described:

At the commencement the screws 21 in plasticisers A and B are forward. The screw in plasticiser A is revolved so transferring material to the space in front of the screw and moving the screw back at a corresponding rate.

With the valves in condition I, screw 21 plasticiser A is forced forward commencing extrusion through the orifice. During this time the screw 21 in plasticiser B is made to revolve transferring material to the space in front of the screw and moving the screw back at a corresponding rate. The screw in plasticiser B reaches its rearmost position prior to or simultaneously with the instant at which the screw plasticiser A reaches a forward position somewhat short of its total forward movement. Valves 18A are changed to condition II simultaneously with the screw in plasticiser B commencing forward movement. At this moment both screws in plasticisers A and B cause material to be delivered through the orifice.

Screw 21 in plasticiser A commences to revolve simultaneously with valves 18A changing to condition III, screw 21 in plasticiser A transferring material to the space in front of the screw and moving the screw back at a corresponding rate whilst the screw in plasticiser B continues the extrusion function. Screw 21 in plasticiser A reaches its rearmost position prior to or simultaneously with the instant at which the screw in plasticiser B reaches a forward position somewhat short of its total movement. Valves 18A are changed to condition II simultaneous with the screw 21 in plasticiser A commencing forward movement. At this moment both screws in plasticisers A and B cause material to be delivered through the orifice.

The force applied to the screws 21 during their forward stroke may be controlled in a manner whereby the pressure exerted upon the raw material and the speed at which the material is forced through the orifice is constant throughout the four phases described above.

With this arrangement for continuous extrusion the revolving motion of the screw primarily serves the plasticising phase, whilst the separate piston-like movement provides the pressure required to force the material through the orifice.

The screw plungers 21 may be driven forward by the action of one hydraulic pump which supplies fluid under pressure and at a constant rate of flow to either of the plungers or both of the plungers simultaneously. When both the plungers are operated simultaneously the individual rate of forward movement is half that achieved when only one plunger is moved forward. Thus a constant flow rate is maintained through the extrusion orifice.

A further embodiment of a rotary valve is shown in FIG. 6. In this case the passages from the plasticiser A and B lie at 90° to each other, and at 135° to the passage to the nozzle. Position I shows plasticiser B feeding the nozzle, Position II shows the nozzle blanked off, and Position III shows plasticiser A feeding the nozzle.

It will be appreciated that if the part 35A is turned through 180° with respect to its position II, both the passages 50 and 51 will communicate with the passages 32A and 33A, so to feed the nozzle from both plasticers simultanteously. This enables the rotary valve of FIG. 6 to be used in an extrusion configuration.

FIG. 7 illustrates the valve of FIG. 6 (in position I) and shows a microswitch 52 operated by the valve between position I and position III to initiate another machine cycle element.

FIG. 8 shows diagrammatically the operation of a set of linear valves which may be used for injection moulding (or blow moulding) as well as for extrusion. Two linear valves are illustrated in FIG. 8. Movable portions 54 and 55 are slidable in guideways 56 and 57 respectively, and each movable portion has a throughway 58 and 59.

In position I the throughway 58 permits the unit A to inject into a moulding machine, while unit B is shut off. In position II both units are blanked off, and in position III the throughway 59 permits the unit B to inject into the moulding machine.

In an alternative arrangement (position IV) both units may be permitted to inject material into the moulding machine simultaneously.

FIG. 9, which is an axial section through one of the linear valves shown in FIG. 8, illustrates a microswitch 60 operated by the valve to initiate another machine cycle element.

Figure 4:
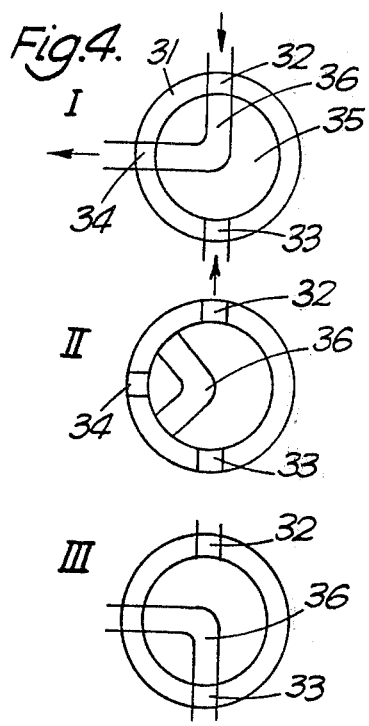
FIG. 4 is a diagrammatic view of a valve used in a first embodiment of the invention and showing three operating positions.

When the apparatus is used to supply plastics material intermittently (i.e. for injection moulding or blow moulding) either one rotary valve may be used for two linked injector units, as in FIG. 4, or one sliding valve may be used for each individual injector unit, as in FIG. 5. In this latter case stage II of FIG. 5 would have both channels closed.

I claim:
1. In a process for moulding plastic materials by providing plasticised plastic materials in first and second separate chambers and forcing the plasticised plastic materials from the separate chambers through a common outlet and into a mould, the improvement comprising:
   1. connecting the first chamber to the common outlet and forcing the plasticised plastic material from that chamber through the common outlet and into the mould to partially fill the mould;
   2. while continuing to force plasticised plastic material from the first chamber, connecting the second chamber to the common outlet and forcing the plasticised plastic materials from both chambers through the common outlet into the mould;
   3. discontinuing the forcing of plasticised plastic material from the first chamber by disconnecting that chamber from the common outlet and continuing to force plasticised plastic material from the second chamber through the common outlet into the mould to further fill the mould; and
   4. discontinuing the forcing of plasticised plastic material from the second chamber by disconnecting that chamber from the common outlet after the desired amount of plasticised plastic material from the second chamber has been forced into the mould.

2. In a process as claimed in claim 1 the improvement comprising connecting the first chamber to the common outlet, and forcing plasticised plastic material from the first chamber into the mould, more than once to fill the mould.

3. Apparatus for moulding plastic materials comprising:
   1. separate first and second chambers;
   2. means for connecting the chambers to a common outlet and to a mould;
   3. means associated with the chambers for providing plasticised plastic material in each chamber;
   4. means for forcing plasticised plastic material from each of the chambers through the common outlet and into the mould;
   5. valve means, disposed between the chambers and the common outlet, for controlling the flow of plasticised plastic material from the chambers to the common outlet;
   6. actuator means for switching said valve means between a plurality of positions, including in sequence;
   a first position being where only the first chamber is connected to the common outlet;
   a second position being where both chambers are connected to the common outlet; and
   a third position being where only the second chamber is connected to the common outlet; and
   said plurality of positions including a fourth position being where both chambers are disconnected from the common outlet.

* * * * *